Figure 1:
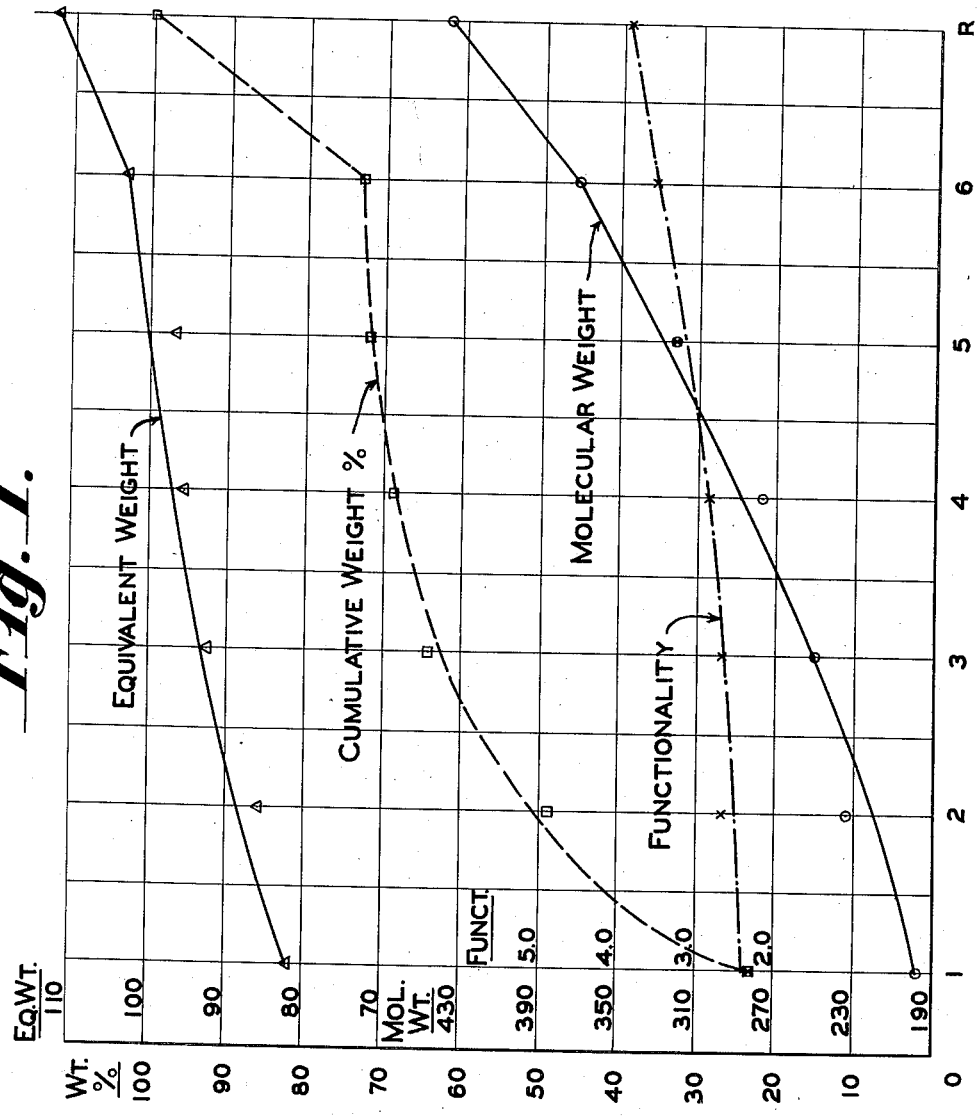

INVENTOR
HENRY C. HOWARD

INVENTOR
HENRY C. HOWARD

Sept. 11, 1956  H. C. HOWARD  2,762,840
METHODS OF FRACTIONATING POLYCARBOXY AROMATIC ACIDS
Filed July 25, 1950  3 Sheets-Sheet 3

INVENTOR
HENRY C. HOWARD

United States Patent Office 2,762,840
Patented Sept. 11, 1956

---

2,762,840

METHODS OF FRACTIONATING POLYCARBOXY AROMATIC ACIDS

Henry C. Howard, Mount Lebanon, Pa., assignor to Carnegie Institute of Technology, Pittsburgh, Pa., a corporation of Pennsylvania Application July 25, 1950, Serial No. 175,783

8 Claims. (Cl. 260—525)

This invention relates to a method of separating mixed polycarboxy aromatic acids and particularly to a method of separating the water-soluble polycarboxy aromatic acids resulting from the oxidation of bituminous coals.

The controlled oxidation of bituminous coals results in relatively high yields of water-soluble polycarboxy aromatic acids. The yield varies generally from 30% to 60% by weight of the original coal depending upon the origin of the coal and the severity of the oxidation reaction. The acids which result from the oxidation of bituminous coals will vary both in molecular size and chemical composition due to the heterogeneous character of the coal structure and its varying chemical composition depending upon its source.

It has been found that the most profitable commercial utilization of these mixed polycarboxy aromatic acids is dependent on the separation of either relatively pure individual acids from the mixture or the separation of relatively homogeneous fractions from the mixture. It has heretofore been proposed to perform such a fractionation by esterification of the acids followed by fractional distillation of the resulting esters. This procedure is however only partly effective because of the high boiling points and the thermal instability of the resulting esters. It has also been proposed to fractionally precipitate the mixed acids in the form of metal salts such as the salts of barium or calcium in aqueous medium of varying pH. The latter method does effect some separation of the polycarboxy aromatic acids but it is slow and expensive. Moreover, the latter of the above methods of separation appears to depend upon both molecular size and chemical structure and therefore does not lead to a systematic fractionation of the acids.

I have found a method of fractionating a mixture of polycarboxy aromatic acids such as results from the controlled oxidation of bituminous coals. I have found that these polycarboxy aromatic acids may be cheaply and effectively fractionated by the proper use of organic solvents of select degrees of solvent action. I have discovered that such polycarboxy aromatic acids may be fractionated by dissolving them in an oxygen containing organic solvent, adding thereto a non-oxygen containing organic solvent, separating the resulting mixture into two phases one of which is rich in oxygen containing organic solvent and the other of which is rich in non-oxygen containing organic solvent, removing the resulting non-oxygen containing organic solvent rich phase from the oxygen containing organic solvent rich phase and carrying with it a fraction of the polycarboxy aromatic acids, and repeating these steps until as many fractions are removed as are desired.

I have found for the purposes of my invention that the oxygen containing organic solvents of the group consisting of ethers, ketones and alcohols are most satisfactory and that a non-oxygen containing organic solvent of the group consisting of pentane and carbon tetrachloride is most effective in separating a fraction of the acids from the oxygen containing organic solvent phase.

Since coals are very heterogeneous in character, high in cyclic compounds, and vary from locality to locality and the acids which result from their oxidation depend upon the character of the coal it is apparent that the character of the fractions will vary from coal to coal. However, for any given mixture of polycarboxy aromatic acids the fractions are reproducible from one successive run to another, so that, having established the conditions for any particular coal, the results can thereafter be consistently reproduced.

The fractionation of polycarboxy acids by this method does not separate a single acid in each fraction but rather a range of acids of similar molecular weight. The range of acids removed in any particular fraction is dependent upon the volumetric ratio of the two organic solvents, i. e., the greater the ratio of non-oxygen containing organic solvent to oxygen containing solvent, the broader the range of acids removed in any one fraction. However, as is pointed out above, for any given mixture of polycarboxy acids the fractionation is reproducible by merely controlling the relative volumetric ratio of the solvents.

The process of my invention will be more clearly understood by referring to the following examples:

EXAMPLE 1

*Fractionation by ether and pentane.*—Approximately 20 parts by weight of the water-soluble polycarboxy aromatic acids recovered by controlled oxidation with oxygen gas of an aqueous, alkaline suspension of a bituminous coal, at 270° and during which about 50% of the carbon of the coal is converted to carbon dioxide, were dissolved in about 100 parts by weight of ethyl ether, by heating under reflux. The ether insoluble acids which did not dissolve in this treatment were separated by filtration. The filtrate which contained the balance of the acids in solution in the ether was treated with about half its volume of commercial pentane, which resulted in the appearance of two liquid phases—an upper, pale, yellow, pentane-rich layer and a lower, orange colored, ether-rich layer. After thorough contacting by agitation, the two phases were allowed to separate and the upper layer removed.

The lower layer was adjusted to its original volume by the addition of ether as required and pentane added as before. This process was repeated until seven fractions were recovered. The nature of the fractionation process is shown by the curves of Fig. 1. In this fractionation seven fractions were recovered, and molecular weight, equivalent weight, functionality and cumulative weight percent were plotted for each fraction. Fractions Nos. 1 and 2 were pale yellow microcrystalline powders, rich in the valuable benzene polycarboxylic acids; fractions Nos. 3, 4, 5 and 6 were light orange in color and resinous in character. Fraction R, the residual material, was reddish brown in color and shellac-like in physical consistency. Fractions Nos. 1 and 2, because of their light color and thermal stability, have been found suitable for resin and plasticizer use. Fraction No. R is unsuitable for these applications, but because of its high functionality has been shown to be a useful dispersing agent for clays in general, and has been found particularly useful in drilling muds. The effectiveness of the fractionation in separating the simple, stable types of acids from the complex unstable ones is confirmed by the following distillation data. The distillation was carried out in a short path still at pressures of about $10^{-3}$ mm. of mercury and at a rapid heating rate, room temperature to 350° C. in one hour. Under these conditions mellitic acid, the benzene hexacarboxylic acid, distills quantitatively without decomposition. It will be observed that the amount of stable distillable acids in the first fraction was threefold that in the last.

*Vacuum distillation*

[Room temperature to 350° C. in one hour. Pressure—$10^{-3}$ mm. Hg]

| Fraction | Distillate, percent | Residue, percent | Gas and Loss, percent |
| --- | --- | --- | --- |
| 1 | 87 | 6 | 7 |
| 2 | 82 | 9 | 9 |
| 3 | 70 | 13 | 17 |
| 4 | 66 | 18 | 16 |
| 5 | 64 | 15 | 21 |
| 6 | 57 | 22 | 21 |
| R | 29 | 54 | 17 |

EXAMPLE 2

Figure 2:
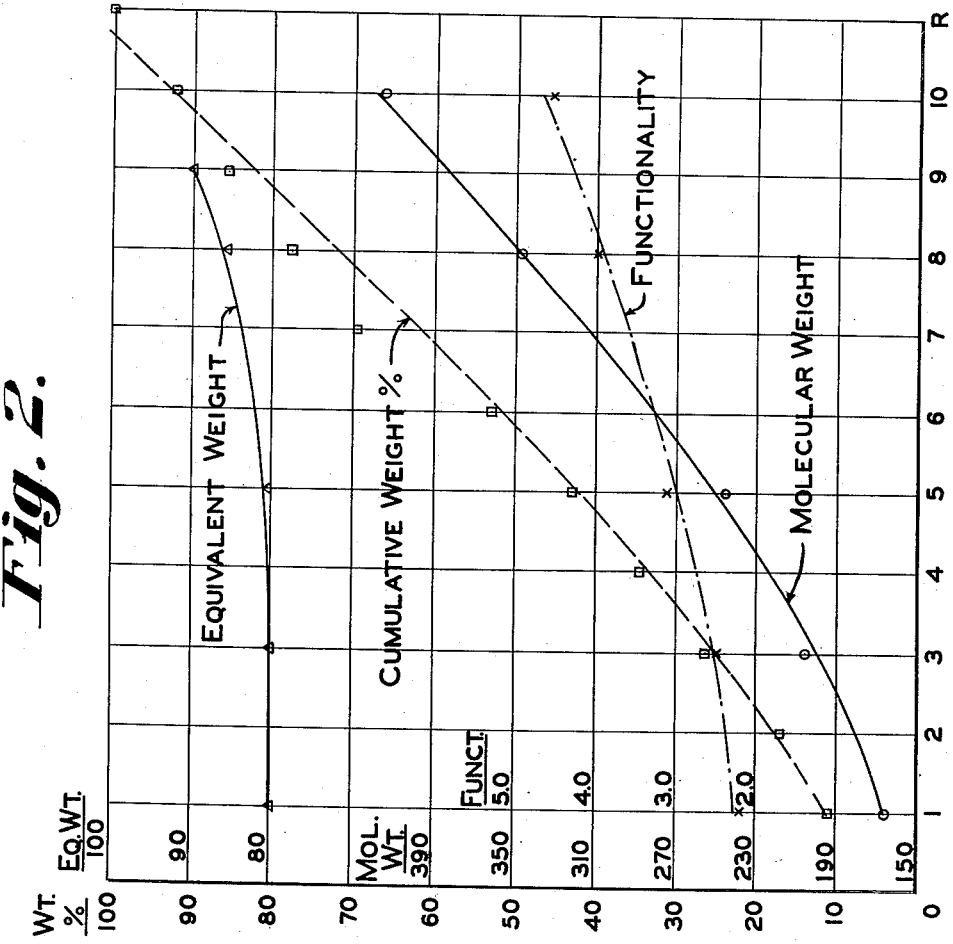

*Fractionation by acetone and pentane.*—A solution of the mixed acids was prepared in the same way and of the same concentration as in Example 1, but using acetone as the oxygen containing solvent, and was treated with an equal volume of pentane. Phase separation occurs as before and the procedure from this point is identical with that described under Example 1. The results of the fractionation are shown in Fig. 2. The general course of the fractionation is the same as in Example 1. This combination of solvents gives somewhat better separation in the higher molecular weight materials, yielding only about 10% in the insoluble residue. This residue was of such high molecular weight that it was insoluble in acetone and other common solvents, and hence molecular weights and other properties could not be determined. The observed molecular weights for the first 50% of the material separated in this fractionation are definitely higher than the corresponding cumulative percent in Example 1, indicating that this solvent pair is less effective in separating the simpler benezene carboxylic acids from the more complex resinous types.

EXAMPLE 3

Figure 3:
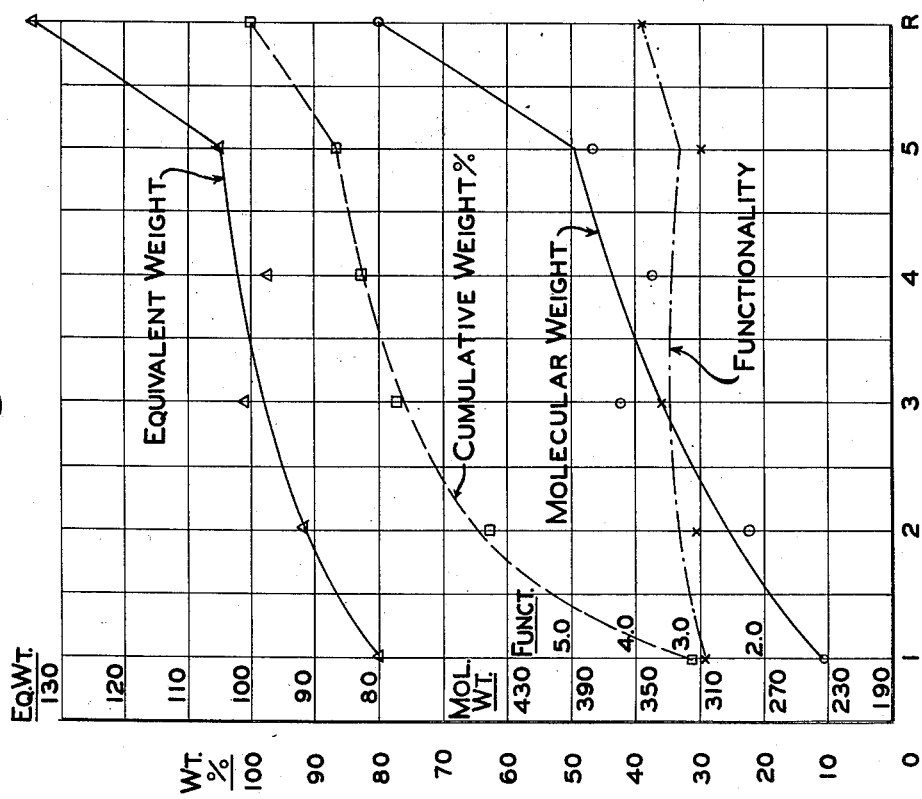

*Fractionation by ether and carbon tetrachloride.*—A solution of the mixed acids in ether was prepared in the same way and of the same concentration as in Example 1 and was treated with one and a half times its volume of carbon tetrachloride. This resulted in the formation of two phases, one of which was fluid and pale yellow in color, the other reddish brown and highly viscous. The latter phase partly settled to the bottom and partly adhered to the sides of the containing vessel. The fluid phase was separated by decantation and the viscous phase redissolved in sufficient ether to make up to the original volume. This ether solution was again treated with one and a half times its volume of carbon tetrachloride and the process continued as before. The fractions were recovered by evaporation. The residue was incompletely soluble in ether, but can be recovered by solution in acetone and evaporation of the acetone solution. The results of the fractionation are shown in Fig. 3.

EXAMPLE 4

*Fractionation by isopropanol and pentane.*—A solution of the mixed acids prepared in the same way and of the same concentration as in Example 1, but using isopropanol as the oxygen containing solvent, was treated with an equal volume of pentane. Unlike the behavior described in Examples 1, 2 and 3, where two liquid phases were formed, a small amount of a flocculent solid phase appeared in one continuous liquid phase. The solid phase was separated by centrifuging, washed with a 1 to 1 mixture of isopropanol and pentane and dried and weighed. To precipitate the next fraction, two volumes of pentane were added and another precipitate formed and recovered. This process was repeated until four fractions had been precipitated. A non-precipitatable fraction was recovered by evaporation of the final solution.

Data on properties of the fractions are shown in Table I. It is evident that, as compared with Examples 1, 2 and 3 in fractionation with this pair of solvents, the higher molecular weight materials are separated first.

*Table I*

| Fraction | Cumulative Weight, Percent | Molecular Weight | Equivalent Weight | Functionality |
| --- | --- | --- | --- | --- |
| 1 | 4.0 | (¹) | 102 | |
| 2 | 4.9 | (¹) | 94 | |
| 3 | 35.1 | 369 | 89 | 4.1 |
| 4 | 56.0 | 335 | 84 | 3.9 |
| R | 100.0 | 190 | 67 | 2.8 |

¹ Insoluble in acetone.

The polycarboxy aromatic acids are normally insoluble in non-oxygen containing organic solvents and I believe that the mechanism which results in the fractionation of my invention is dependent upon the formation of a non-oxygen containing organic solvent rich layer containing some oxygen containing solvent thereby forming a phase having a selective solvent action upon the lowest molecular weight acids in the mixture dissolved in the oxygen containing solvent phase. While this theory seeems consistent with observed facts I do not wish to be bound thereby and merely suggest it as a possible explanation for the unexpected results which I have obtained.

While I have set out certain examples of fractionation performed on mixtures of polycarboxy aromatic acids it will be understood that the scope of my invention is not limited to these examples but may be otherwise embodied or practiced within the scope of the following claims.

I claim:

1. The method of fractionating mixed polycarboxy aromatic acids of differing molecular weights obtained from the oxidation of bituminous coals which comprises the steps of dissolving the polycarboxy aromatic acids in an oxygen containing organic solvent of the group consisting of ethers, ketones and alcohols, adding to the resulting solution an organic solvent of the group consisting of pentane and carbon tetrachloride, separating the resulting mixture into an oxygen containing organic solvent rich phase and a second phase rich in one of the group pentane and carbon tetrachloride, said second phase containing a fraction of polycarboxy aromatic acids of lower molecular weight removing the second phase from the oxygen containing organic solvent rich phase and repeating these steps until as many fractions are recovered as may be desired.

2. The method of fractionating mixed polycarboxy aromatic acids of differing molecular weight obtained from the oxidation of bituminous coals which comprises the steps of dissolving the polycarboxy aromatic acids in ethyl ether, adding to the resulting solution an amount of pentane equal to about one half of the volume of the ether solution separating the resulting mixture into an ether rich phase and a pentane rich phase said pentane rich phase containing a fraction of polycarboxy aromatic acids of lower molecular weight, removing the pentane rich phase from the ether rich phase, adjusting the remaining ether rich phase to its original volume and repeating the steps of adding pentane, separating the two phases, and removing the pentane rich phase said pentane rich phase containing a fraction of polycarboxy aromatic acids of lower molecular weight until as many fractions are recovered as may be desired.

3. The method of fractionating mixed polycarboxy aromatic acids of differing molecular weight obtained from the oxidation of bituminous coals which comprises the steps of dissolving the polycarboxy aromatic acids in ethyl ether, adding to the resulting solution an amount of carbon tetrachloride equal to about one half of the volume of the ether solution, separating the resulting mixture into an ether rich phase and a carbon tetrachloride rich phase said carbon tetrachloride phase containing a fraction of polycarboxy aromatic acids of lower molecular weight, removing the carbon tetrachloride rich phase from the ether rich phase, adjusting the remaining ether rich phase to its original volume and repeating the steps of adding carbon tetrachloride, separating the two phases, and removing the carbon tetrachloride rich phase containing a fraction of polycarboxy aromatic acids of lower molecular weight until as many fractions are recovered as may be desired.

4. The method of fractionating mixed polycarboxy aromatic acids of differing molecular weight obtained from the oxidation of bituminous coals which comprises the steps of dissolving the polycarboxy aromatic acids in an ether, adding to the resulting solution an organic solvent from the group consisting of pentane and carbon tetrachloride, separating the resulting mixture into an ether rich phase and a second phase rich in organic solvent from the group consisting of pentane and carbon tetrachloride, said second phase containing a fraction of polycarboxy aromatic acids of lower molecular weight, removing the second phase from the ether rich phase and repeating the steps of adding an organic solvent of the group consisting of pentane and carbon tetrachloride to the ether rich phase, separating into two phases, and removing the resulting phase rich in organic solvent of the group consisting of pentane and carbon tetrachloride and containing a fraction of polycarboxy aromatic acids of lower molecular weight from the ether rich phase until as many fractions are recovered as may be desired.

5. The method of fractionating mixed polycarboxy aromatic acids of differing molecular weight obtained from the oxidation of bituminous coals which comprises the steps of dissolving the polycarboxy aromatic acids in acetone, adding to the resulting solution an amount of pentane equal to about one half of the volume of the acetone solution, separating the resulting mixture into an acetone rich phase and a pentane rich phase said pentane rich phase containing a fraction of polycarboxy aromatic acids of lower molecular weight, removing the pentane rich phase from the acetone rich phase, adjusting the remaining acetone rich phase to its original volume and repeating the steps of adding pentane, separating the two phases, and removing the pentane rich phase containing a fraction of polycarboxy aromatic acids of lower molecular weight until as many fractions are recovered as may be desired.

6. The method of fractionating mixed polycarboxy aromatic acids of differing molecular weight obtained from the oxidation of bituminous coals which comprises the steps of dissolving the polycarboxy aromatic acids in a ketone, adding to the resulting solution an organic solvent from the group consisting of pentane and carbon tetrachloride, separating the resulting mixture into a ketone rich phase, and a second phase rich in one of the group consisting of pentane and carbon tetrachloride, said second phase containing a fraction of polycarboxy aromatic acids of lower molecular weight, removing the second phase from the ketone rich phase and repeating the steps of adding an organic solvent of the group consisting of pentane and carbon tetrachloride to the ketone rich phase, separating into two phases, and removing the resulting phase rich in organic solvent of the group consisting of pentane and carbon tetrachloride and containing a fraction of polycarboxy aromatic acids of lower molecular weight from the ketone rich phase until as many fractions are recovered as may be desired.

7. The method of fractionating mixed polycarboxy aromatic acids of differing molecular weight obtained from the oxidation of bituminous coals which comprises the steps of dissolving the polycarboxy aromatic acids in an alcohol, adding to the resulting solution an organic solvent of the group consisting of pentane and carbon tetrachloride, separating the resulting mixture into an alcohol rich phase and a second phase rich in organic solvent of the group consisting of pentane and carbon tetrachloride, said second phase containing a fraction of polycarboxy aromatic acids of lower molecular weight, removing the second phase from the alcohol rich phase and repeating the steps of adding an organic solvent of the group consisting of pentane and carbon tetrachloride to the alcohol rich phase, separating into two phases, and removing the resulting phase rich in organic solvent selected from the group consisting of pentane and carbon tetrachloride and containing a fraction of polycarboxy aromatic acids of lower molecular weight from the alcohol rich phase until as many fractions are recovered as may be desired.

8. The method of fractionating mixed polycarboxy aromatic acids of differing molecular weight obtained from the oxidation of bituminous coals which comprises the steps of dissolving the polycarboxy aromatic acids in isopropanol, adding to the resulting solution an amount of pentane equal to about one half of the volume of the isopropanol solution, separating the resulting mixture into an isopropanol rich phase and a pentane rich phase containing a fraction of polycarboxy aromatic acids of lower molecular weight, removing the pentane rich phase from the isopropanol rich phase, adjusting the remaining isopropanol rich phase to its original volume and repeating the steps of adding pentane, separating the two phases, and removing the pentane rich phase containing a fraction of polycarboxy aromatic acids of lower molecular weight until as many fractions are recovered as may be desired.

References Cited in the file of this patent

UNITED STATES PATENTS

| | | |
|---|---|---|
| 2,193,337 | Leicester | Mar. 12, 1940 |
| 2,245,945 | Van Dijck et al. | June 17, 1941 |
| 2,278,309 | Freeman | Mar. 31, 1942 |
| 2,296,039 | Knowles et al. | Sept. 15, 1942 |
| 2,301,528 | Ewing | Nov. 10, 1942 |
| 2,461,740 | Kiebler | Feb. 15, 1949 |

OTHER REFERENCES

MacArdle "Solvents in Synthetic Org. Chem." (Van Nostrand), pp. 149–153 (1925).